United States Patent
Kainuma et al.

(10) Patent No.: US 6,935,603 B2
(45) Date of Patent: Aug. 30, 2005

(54) VIBRATION ISOLATION TABLE

(75) Inventors: Masakuni Kainuma, Saitama (JP); Toshikazu Aoki, Saitama (JP); Keiji Tamaki, Saitama (JP); Katsuo Uematsu, Saitama (JP); Tomomasa Fujita, Saitama (JP); Hiroshi Chinda, Saitama (JP); Akihiro Hayashi, Saitama (JP)

(73) Assignee: Fujikura Rubber Ltd., Tokyo (JP)

( * ) Notice: Subject to any disclaimer, the term of this patent is extended or adjusted under 35 U.S.C. 154(b) by 72 days.

(21) Appl. No.: 10/722,250

(22) Filed: Nov. 25, 2003

(65) Prior Publication Data

US 2004/0104329 A1 Jun. 3, 2004

(30) Foreign Application Priority Data

Nov. 28, 2002 (JP) ........................................ 2002-345871

(51) Int. Cl.[7] ............................................... F16M 13/00
(52) U.S. Cl. ......................... 248/562; 248/599; 248/602
(58) Field of Search ................................ 248/562, 566, 248/574, 580, 581, 599, 602, 604, 605, 615, 636, 638

(56) References Cited

U.S. PATENT DOCUMENTS

| | | | | |
|---|---|---|---|---|
| 2,583,080 A | * | 1/1952 | Beerli | 384/270 |
| 3,788,587 A | * | 1/1974 | Stemmler | 248/562 |
| 4,644,714 A | * | 2/1987 | Zayas | 52/167.4 |
| 4,648,577 A | * | 3/1987 | Weber | 248/562 |
| 5,337,991 A | * | 8/1994 | Young | 248/636 |
| 5,379,991 A | * | 1/1995 | Delam et al. | 267/136 |
| 2004/0104330 A1 | * | 6/2004 | Kainuma et al. | 248/638 |

FOREIGN PATENT DOCUMENTS

| | | |
|---|---|---|
| JP | 2002-070947 | 3/2002 |
| JP | 2003-056640 | 2/2003 |

* cited by examiner

*Primary Examiner*—Anita King
*Assistant Examiner*—Amy J. Sterling
(74) *Attorney, Agent, or Firm*—McCormick, Paulding & Huber LLP

(57) ABSTRACT

A vibration isolation table includes a stationary housing having an opening on a top surface thereof; a primary movable base which is supported by the stationary housing, and includes a bottomed hollow cylindrical portion which extends downwards into the stationary housing, and a flange portion which projects radially outwards from an upper end of the bottomed hollow cylindrical portion; a pressure chamber formed between the flange portion and the top surface of the stationary housing; and a vibration-free movable base on which an object to be isolated from vibration is mounted, the vibration-free movable base having a swingable rod which is inserted into the bottomed hollow cylindrical portion so that a bottom end of the swingable rod is supported by a base of the bottomed hollow cylindrical portion in a manner to allow the swingable rod to swing with respect to the bottomed hollow cylindrical portion.

6 Claims, 2 Drawing Sheets

VIBRATION ISOLATION TABLE

CROSS REFERENCE TO RELATED APPLICATION

The present application is related to and claims priority of the following co-pending application, namely, Japanese patent application number 2002-345871 filed on Nov. 28, 2002. The above-identified application is incorporated herein by reference in its entirety.

BACKGROUND OF THE INVENTION

1. Field of the Invention

The present invention relates to a vibration isolation table for supporting an object to be isolated from vibration such as a precision instrument while isolating the object from vibration which is transmitted from the floor to the vibration isolation table, and more specifically relates to such a vibration isolation table, the natural vibration frequency of which in the horizontal direction is small.

2. Description of the Related Art

As an example of a vibration isolation table for preventing vibration from the floor from being transmitted to a precision instrument (e.g., an optical stepper or an electron microscope) which is supported by the vibration isolation table, a vibration isolation table wherein a bellows is fixed to an upper part of a stationary housing, a mount on which a precision instrument is mounted is fixed on top of the bellows, and the bellows deforms horizontally upon receiving horizontal vibration, is known in the art.

The natural frequency of the vibration isolation table can be greatly reduced with the bellows. If horizontal vibration is transmitted to the bellows from the floor, the bellows deforms horizontally with flexibility to isolate the precision instrument from the horizontal vibration from the floor in an effective manner.

Although an improved vibration isolation table in which the natural vibration frequency thereof in the horizontal direction is further reduced to thereby further improve the performance of the horizontal vibration isolating operation has been desired in recent years, no conventional vibration isolation tables of the aforementioned type can offer satisfactory performance in the horizontal vibration isolating operation.

On the other hand, since the aforementioned bellows cannot return to its original shape by itself after being deformed in a horizontal plane, the precision instrument which is mounted on the mount of the vibration isolation table remains inclined with respect to a horizontal plane if the bellows remains deformed.

SUMMARY OF THE INVENTION

The present invention provides a vibration isolation table, wherein the performance of a horizontal vibration isolating operation of the vibration isolation table is improved to exert substantially no influence of horizontal vibration on an object which is to be isolated from vibration, and wherein the object can be made to return to a horizontal position automatically if the object inclines due to horizontal vibration from the floor.

According to an aspect of the present invention, a vibration isolation table is provided, including a stationary housing having an opening on a top surface of the stationary housing; a primary movable base which is supported by the stationary housing, and includes a bottomed hollow cylindrical portion which extends downwards into the stationary housing through the opening of the stationary housing, and a flange portion which projects radially outwards from an upper end of the bottomed hollow cylindrical portion; a pressure chamber formed between the flange portion and the top surface of the stationary housing; and a vibration-free movable base on which an object to be isolated from vibration is mounted, the vibration-free movable base having a swingable rod which is inserted into the bottomed hollow cylindrical portion so that a bottom end of the swingable rod is supported by a base of the bottomed hollow cylindrical portion in a manner to allow the swingable rod to swing with respect to the bottomed hollow cylindrical portion.

It is desirable for the vibration isolation table to further include a bellows which surrounds a space defined between the flange portion and the stationary housing; and a pressure-tight flexible member positioned between the bottomed hollow cylindrical portion and the opening of the stationary housing. The pressure chamber is formed by the bellows, the flange portion, the bottomed hollow cylindrical portion, the stationary housing and the pressure-tight flexible member.

The bellows can include a plurality of pleats.

It is desirable for the pressure-tight flexible member to include a rubber sealing ring which is fitted on the bottomed hollow cylindrical portion so that at least part of the rubber sealing ring is inserted into the opening of the stationary housing.

It is desirable for the stationary housing to include a plurality of through holes each serving as an air passage.

It is desirable for opposite ends of the bellows to be fixed to the flange portion and the top surface of the stationary housing, respectively.

The present disclosure relates to subject matter contained in Japanese Patent Application No.2002-345871 (filed on Nov. 28, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
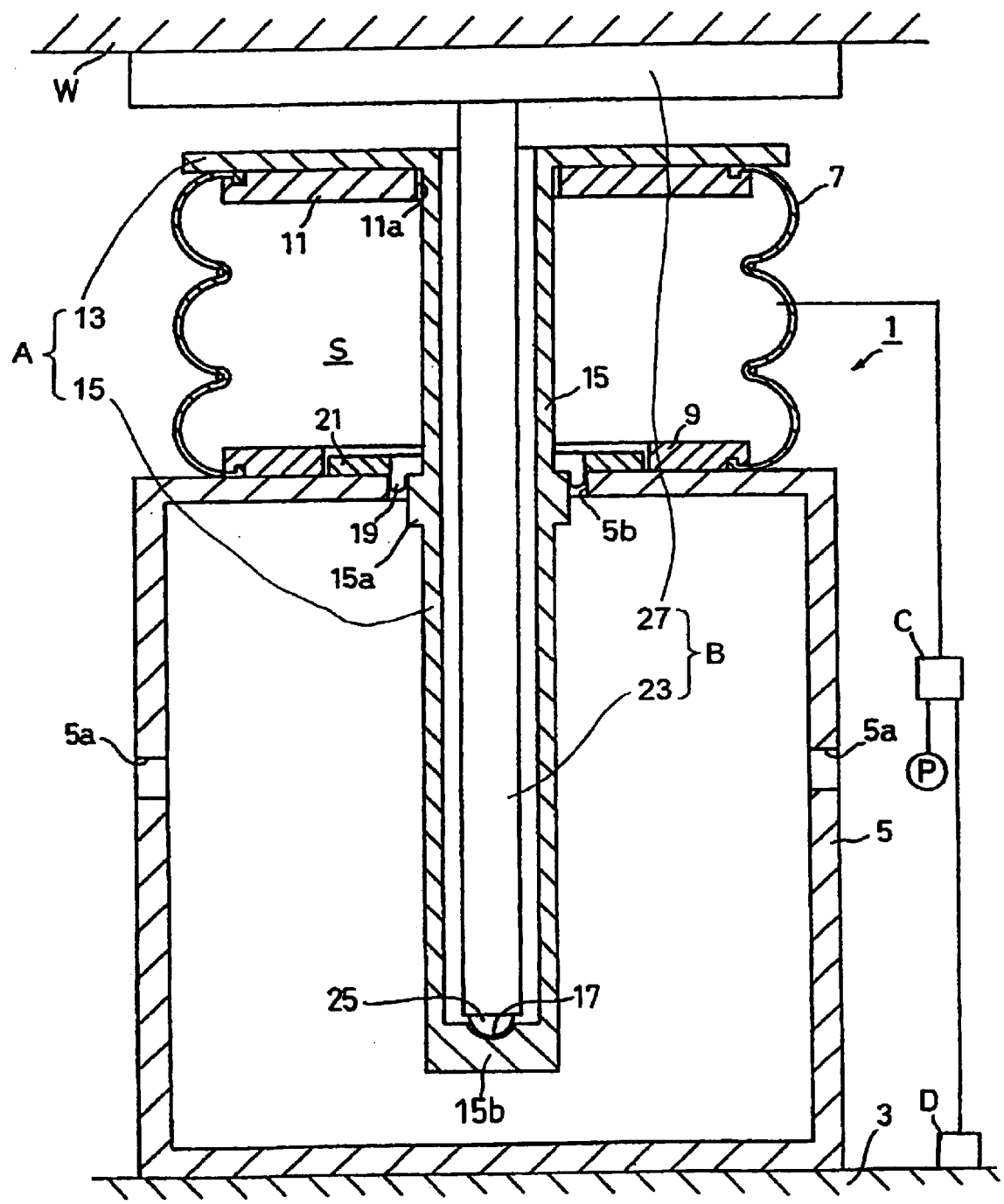
FIG. 1 is a longitudinal cross sectional view of an embodiment of a vibration isolation table according to the present invention.

An embodiment of a vibration isolation table 1 is provided with a stationary housing 5 which is placed on a floor 3. The stationary housing 5 is provided on a side wall thereof with a plurality of through holes (air passages) 5a (only two of them appear in FIGS. 1 and 2). The stationary housing 5 is provided on a top wall thereof with a circular insertion hole (opening) 5b. The vibration isolation table 1 is provided on the top wall of the stationary housing 5 with an annular bellows 7 made of rubber which is pleated with three pleats. A ring-shaped bellows-fixing lower plate 9 is fixed to an upper surface of the top wall of the stationary housing 5 so that a lower peripheral edge of the annular bellows 7 is held tight in an airtight fashion between the outer edge of the bellows-fixing lower plate 9 and the upper surface of the top wall of the stationary housing 5. The bellows-fixing lower plate 9 is fixed to the top wall of the stationary housing 5 by a fixing device such as set screws (not shown).

The vibration isolation table 1 is provided with a primary movable base A which is supported by the stationary housing 5. The primary movable base A consists of a bottomed hollow cylindrical portion 15 and a flange portion 13. The flange portion 13 projects radially outwards from an upper end of the bottomed hollow cylindrical portion 15. The flange portion 13 is positioned above the stationary housing 5, and the bottomed hollow cylindrical portion 15 extends downwards from the center of the flange portion 13 into the stationary housing 5 through the circular insertion hole 5b.

A ring-shaped bellows-fixing upper plate 11 which is provided at a center thereof with a through hole 11a is fixed to a bottom surface of the flange portion 13 with the bottomed hollow cylindrical portion 15 being inserted through the through-hole 11a so that an upper peripheral edge of the annular bellows 7 is held tight in an airtight manner between the outer edge of bellows-fixing upper plate 11 and the bottom surface of the flange portion 13. The bellows-fixing upper plate 11 is fixed to the flange portion 13 by a fixing device such as set screws (not shown).

An upper end of the bottomed hollow cylindrical portion 15 is formed as an open end. A base 15b of the bottomed hollow cylindrical portion 15 is provided on a top surface inside the bottomed hollow cylindrical member 15 with a concave (bowl-shaped) supporting surface 17.

The bottomed hollow cylindrical portion 15 is provided, on an outer peripheral surface thereof in a middle portion of the outer peripheral surface in an axial direction of the bottomed hollow cylindrical portion 15, with an annular projecting portion 15a which projects radially outwards, while a rubber sealing ring (pressure-tight flexible member) 19 is fitted on the bottomed hollow cylindrical portion 15 so that an inner peripheral surface of the rubber sealing ring 19 is in intimate contact with an outer peripheral surface of the annular projecting portion 15a in an airtight fashion. An outer edge of the rubber sealing ring 19 is bent downwards to be fitted into the circular insertion hole 5b and held tight in an airtight fashion between an outer peripheral surface of the annular projecting portion 15a and an inner peripheral surface of the top wall of the stationary housing 5 in the circular insertion hole 5b. The rubber sealing ring 19 acts as a shield between the annular projecting portion 15a and the circular insertion hole 5b, and permits vertical movement and swinging movement of the bottomed hollow cylindrical portion 15 with respect to the circular insertion hole 5b. A flat fixing ring 21 is fixed to the top wall of the stationary housing 5 with an inner peripheral surface of the flat fixing ring 21 being fitted on the rubber sealing ring 19 in an airtight fashion.

The annular bellows 7, the flange portion 13, the bottomed hollow cylindrical portion 15, the stationary housing 5 and the rubber sealing ring 19 form a pressure chamber (airtight chamber) S. Regulated compressed air is pumped into the pressure chamber S by an air pump (compressed air source) P and an air-pressure control system C. The air-pressure control system C is supplied with information on vibration of the floor 3 which is sensed by a vibration detector D to control pressure of the air which is pumped into the pressure chamber S in accordance with the detected vibration of the floor 3.

The vibration isolation table 1 is provided with a vibration-free movable base B which is supported by the bottomed hollow cylindrical portion 15 to be freely swingable with respect to the bottomed hollow cylindrical portion 15. The vibration-free movable base B is provided with a swingable rod 23 and a mounting plate 27. The swingable rod 23 is inserted into the bottomed hollow cylindrical portion 15 until the bottom end of the swingable rod 23 contacts the concave supporting surface 17 so that the swingable rod 23 can swing (oscillate) with the bottom end thereof being the center of oscillation. The mounting plate 27 is formed integral with the upper end of the swingable rod 23. An axis of the swingable rod 23 is orthogonal to the mounting plate 27. The swingable rod 23 is provided at the bottom end thereof with a hemispherical end 25 which facilitates the swinging action of the vibration-free movable base B.

Operations and effects of the vibration isolation table 1 having the above described structure will be discussed hereinafter.

First of all, a precision instrument (to be isolated from vibration) W such as an optical stepper or an electron microscope is mounted on the top surface of the mounting plate 27.

Figure 2:
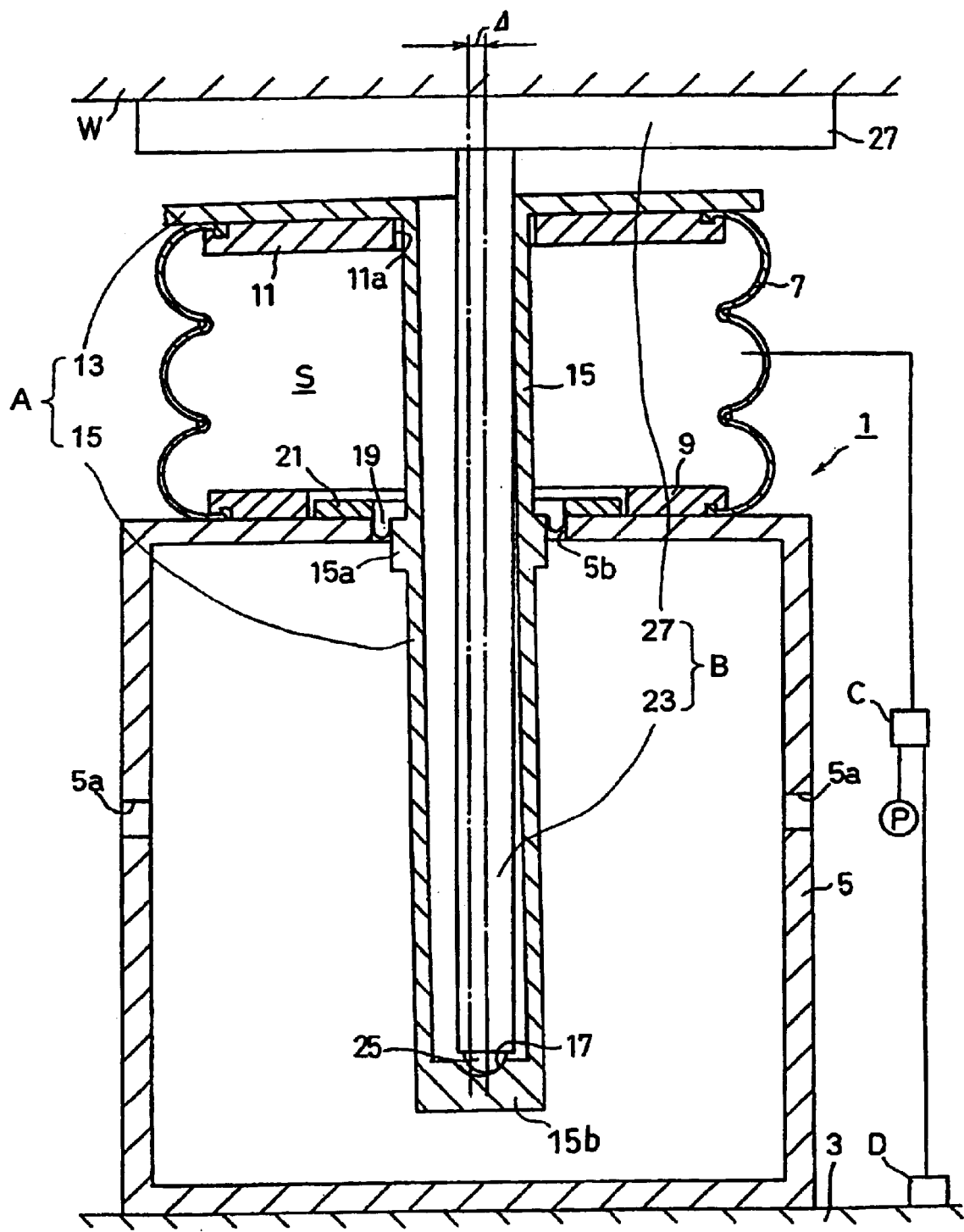
FIG. 2 is a longitudinal cross sectional view of the vibration isolation table shown in FIG. 1, showing a state where the floor on which vibration isolation table is placed vibrates horizontally.

In this state, if the floor 3 vibrates, horizontal components of the vibrations of the floor 3 are transmitted to the vibration isolation table 1 (the stationary housing 5). This causes the bottomed hollow cylindrical portion 15 to swing (oscillate) in directions opposite to the directions of horizontal vibrations of the stationary housing 5 with the annular projecting portion 15a, which remains in contact with the rubber sealing ring 19, being the center of oscillation. During this swinging operation of the bottomed hollow cylindrical portion 15, the swingable rod 23 keeps in a vertical position as shown in FIG. 2. Such operations of the bottomed hollow cylindrical portion 15 and the swingable rod 23 greatly reduce the horizontal vibrations which are transmitted from the floor 3 to the precision instrument W.

The oscillations of the bottomed hollow cylindrical portion 15 which are created by vibrations of the floor 3 cause the annular bellows 7, the upper peripheral edge of which is fixed to the flange portion 13, to be deformed slightly (see FIG. 2). This deforming operation of the annular bellows 7 further effects a substantial reduction in the horizontal vibrations which are transmitted from the floor 3 to the precision instrument W.

Due to such operations of the bottomed hollow cylindrical portion 15 and the annular bellows 7, the mounting plate 27 does not substantially deviate horizontally (in directions opposite to the directions of the horizontal vibrations of the stationary housing 5) so long as the stationary housing 5 having the primary movable base A moves horizontally only within a maximum amount Δ (delta) from a neutral position.

As described above, the natural vibration frequency of the vibration isolation table 1 in the horizontal direction is greatly reduced to a smaller degree by a combination of the bottomed hollow cylindrical portion 15, the swingable rod 23 and the annular bellows 7 to thereby improve the performance of the horizontal vibration isolating operation of the vibration isolation table 1 by a greater degree. Accordingly, almost all horizontal vibrations of the vibration isolation table 1 which are created by vibration of the floor 3 are prevented from being transmitted to the mounting plate 13 by the combination of the bottomed hollow cylindrical portion 15, the swingable rod 23 and the annular bellows 7, thus not being transferred to the precision instrument W.

In the present embodiment of the vibration isolation table, the rigidity of the annular bellows 7 in a horizontal direction is smaller than that of an annular bellows having only one pleat since the annular bellows 7 of the vibration isolation table 1 has three pleats. Therefore, the annular bellows 7 can be easily deformed horizontally, which makes it easy for the bottomed hollow cylindrical portion 15 to swing (oscillate). Consequently, the precision instrument W can be isolated from horizontal vibration from the floor 3 in an effective manner.

If the floor 3 vibrates vertically, the annular bellows 7 deforms vertically to allow the stationary housing 5 (including the ring-shaped bellows-fixing lower plate 9 and the flat fixing ring 21) to relatively move up and down with respect to the bottomed hollow cylindrical portion 15, the swingable rod 23 and the mounting plate 27 while expanding and contracting the annular bellows 7 vertically. This action of the vibration isolation table 1 prevents almost all vertical vibrations of the vibration isolation table 1 which are created by vibration of the floor 3 from being transmitted to the mounting plate 27, and accordingly, almost all vertical vibrations of the vibration isolation table 1 are not transferred to the precision instrument W.

Once the floor 3 stops vibrating, the swingable rod 23 stops swinging and automatically returns to a vertical position thereof shown in FIG. 1, and at the same time, the annular bellows 7 automatically returns to its original shape. Consequently, the precision instrument W can be supported by the vibration isolation table 1 with stability.

Although the annular bellows 7 has three annular pleats in the above illustrated embodiment of the vibration isolation table 1, the annular bellows 7 can be of a type having only one or two pleats, or more than three pleats. The annular bellows 7 can be of a type having only one pleat, however, the annular bellows 7 becomes slightly difficult to be deformed.

As can be understood from the foregoing, according to the present invention, the performance of the horizontal vibration isolating operation of the vibration isolation table is improved to exert substantially no influence of the horizontal vibration on an object which is to be isolated from vibration, and the object can be made to return to a horizontal position automatically if the object inclines by horizontal vibration from the floor.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A vibration isolation table comprising:
   a stationary housing having an opening on a top surface of said stationary housing;
   a primary movable base which is supported by said stationary housing, and includes a bottomed hollow cylindrical portion which extends downwards into said stationary housing through said opening of said stationary housing, and a flange portion which projects radially outwards from an upper end of said bottomed hollow cylindrical portion;
   a pressure chamber formed between said flange portion and said top surface of said stationary housing; and
   a vibration-free movable base on which an object to be isolated from vibration is mounted, said vibration-free movable base having a swingable rod which is inserted into said bottomed hollow cylindrical portion so that a bottom end of said swingable rod is supported by a base of said bottomed hollow cylindrical portion in a manner to allow said swingable rod to swing with respect to said bottomed hollow cylindrical portion.

2. The vibration isolation table according to claim 1, further comprising:
   a bellows which surrounds a space defined between said flange portion and said stationary housing; and
   a pressure-tight flexible member positioned between said bottomed hollow cylindrical portion and said opening of said stationary housing,
   wherein said pressure chamber is formed by said bellows, said flange portion, said bottomed hollow cylindrical portion, said stationary housing and said pressure-tight flexible member.

3. The vibration isolation table according to claim 2, wherein said bellows comprises a plurality of pleats.

4. The vibration isolation table according to claim 2, wherein said pressure-tight flexible member comprises a rubber sealing ring which is fitted on said bottomed hollow cylindrical portion so that at least part of said rubber sealing ring is inserted into said opening of said stationary housing.

5. The vibration isolation table according to claim 1, wherein said stationary housing comprises a plurality of through holes each serving as an air passage.

6. The vibration isolation table according to claim 1, wherein opposite ends of said bellows are fixed to said flange portion and said top surface of said stationary housing, respectively.

* * * * *